May 1, 1962　　　　O. H. BANKER　　　　3,032,134
ADJUSTABLE STEERING ARRANGEMENT FOR
AUTOMOTIVE LAND VEHICLES
Filed Sept. 13, 1960　　　　　　　　　　　　4 Sheets-Sheet 1

INVENTOR.
OSCAR H. BANKER

BY
RICHEY, McNENNY & FARRINGTON
William J. Flynn
ATTORNEYS

May 1, 1962

O. H. BANKER 3,032,134

ADJUSTABLE STEERING ARRANGEMENT FOR
AUTOMOTIVE LAND VEHICLES

Filed Sept. 13, 1960

INVENTOR.
OSCAR H. BANKER

BY
RICHEY, McNENNY & FARRINGTON

William J Flynn
ATTORNEYS

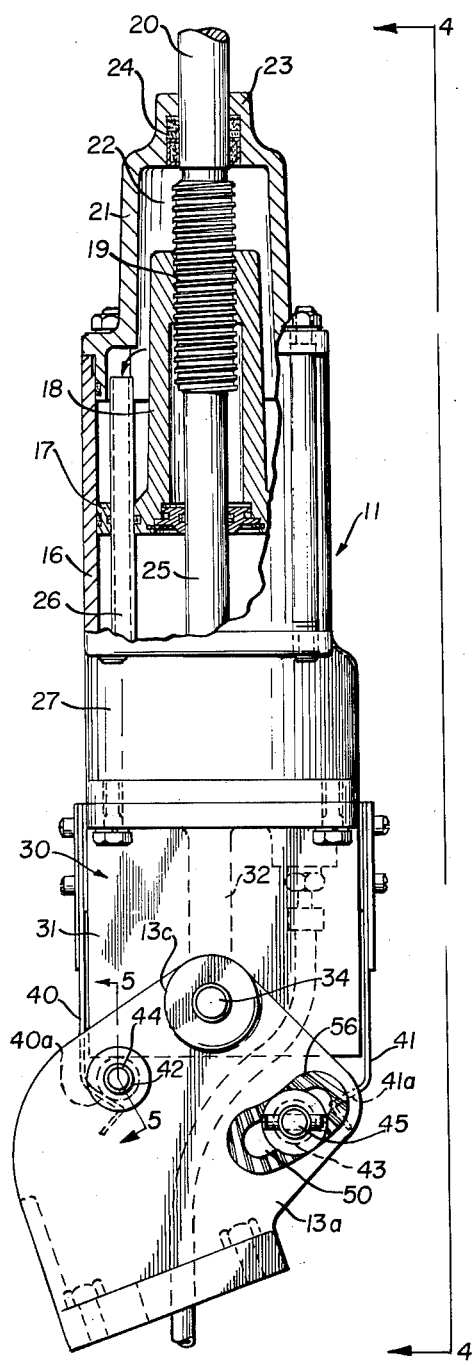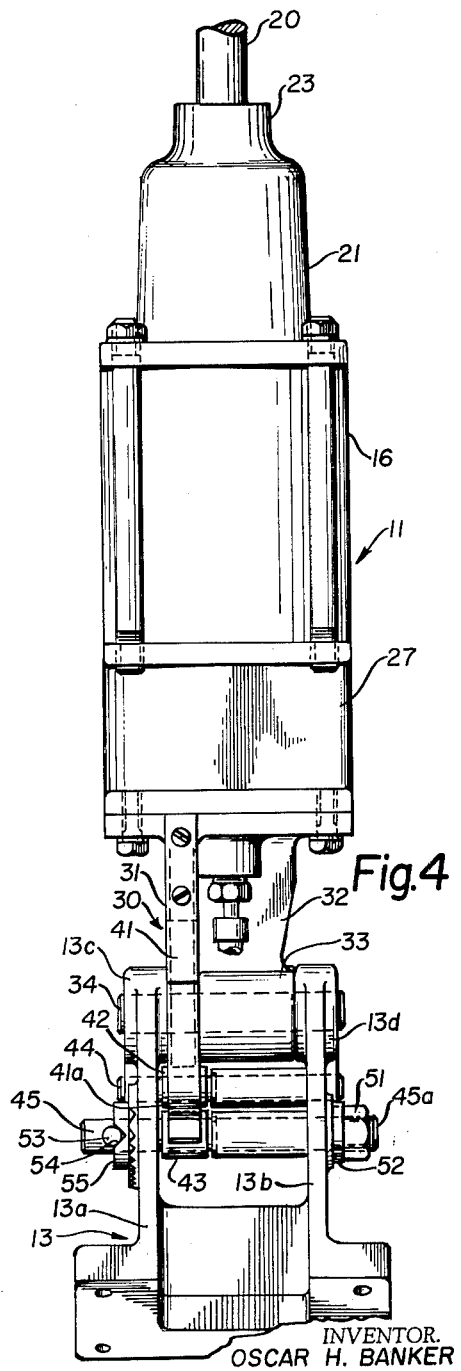
Fig. 3
Fig. 4
INVENTOR.
OSCAR H. BANKER
BY
RICHEY, McNENNY & FARRINGTON
William J. Flynn
ATTORNEYS United States Patent Office 3,032,134
Patented May 1, 1962

3,032,134
ADJUSTABLE STEERING ARRANGEMENT FOR AUTOMOTIVE LAND VEHICLES
Oscar H. Banker, Bay Village, Ohio, assignor to Fawick Corporation, Cleveland, Ohio, a corporation of Michigan
Filed Sept. 13, 1960, Ser. No. 55,667
3 Claims. (Cl. 180—79.2)

This invention relates to an adjustable steering arrangement for automotive land vehicles, such as tractors, trucks and automobiles, equipped with power steering.

On various land vehicles, such as tractors, trucks and automobiles, it is highly desirable to be able to move the steering wheel to an out-of-the-way position when the vehicle is not being driven, so as to make it easier for the driver to get into and out of the driver's seat. The present invention is directed to a novel and advantageous arrangement which enables this to be done readily and conveniently.

In accordance with a further aspect of the present invention, the adjustable steering wheel column is arranged for limited angular adjustment of its driving position so that the steering wheel may be selectively positioned in accordance with the preference of the driver.

Another aspect of the present invention is concerned with an adjustable steering arrangement for trucks of the tilting cab type. Prior to the present invention there has been no convenient and effective arrangement whereby such trucks may be provided with power steering and at the same time have the tilting cab feature. The present invention makes this possible in a simplified and advantageous manner.

It is an object of this invention to provide a novel and improved adjustable steering arrangement for automotive land vehicles equipped with power steering.

It is also an object of this invention to provide such an arrangement which is particularly suited for use on a vehicle having a power steering unit which has part of the power steering control mechanism in the steering column, such as shown in my co-pending application, Serial No. 860,164.

Another object of this invention is to provide on a vehicle equipped with power steering a novel adjustable steering wheel column arrangement which is adapted to be shifted from its operative, driving position to a raised, out-of-the-way position, and back again, with ease and convenience.

Another object of this invention is to provide on a vehicle equipped with power steering a novel adjustable steering wheel column arrangement having provision for adjustment of its operative, driving position so that the position of the steering wheel may be adjusted to suit the preference of the driver.

A further object of this invention is to provide on a tilting cab truck a novel steering arrangement including power steering means for the truck and a steering column which is tiltable with the cab and which controls the operation of the power steering means.

Further objects and advantages of this invention will be apparent from the following detailed description of two presently-preferred embodiments thereof, which are illustrated in the accompanying drawings.

In the drawings:
FIG. 1 is a schematic view showing in side elevation the adjustable steering column of the present invention on an automotive vehicle, the column being shown in full lines in its operative, driving position and in dotted lines in its raised, out-of-the-way position;

FIG. 3 is an enlarged fragmentary side elevation of the steering wheel column, with parts broken away for clarity, showing the column locked in its raised, out-of-the-way position;

FIG. 4 is a front elevational view of the steering wheel column, viewed from the line 4—4 in FIG. 3;

FIGURE 8 is a fragmentary side elevation of a tilting cab truck incorporating the present invention.

Figure 1:
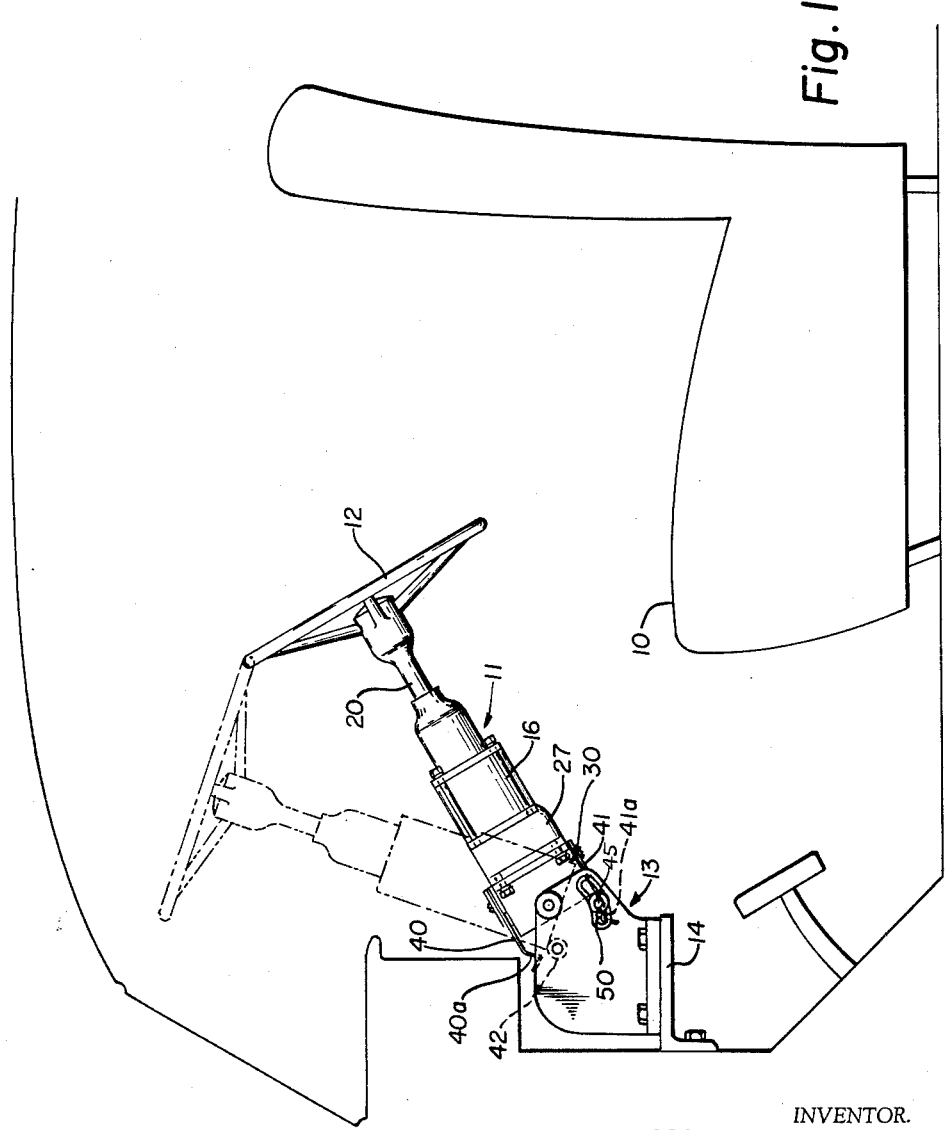

Referring first to FIG. 1, the adjustable steering wheel column arrangement of the present invention is shown incorporated in an automotive land vehicle provided with the usual driver's seat 10. The steering column, which is designated in its entirety by the reference numeral 11, carries the usual steering wheel 12 at its upper end. In accordance with the present invention, the steering column 11 is pivotally mounted at its lower end on a bifurcated bracket 13 which is fixedly supported by an angle plate 14 attached to the body of the vehicle.

In accordance with the present invention, the steering column may be adjusted pivotally from the operative, driving position, which is shown in full lines in FIG. 1, to a raised, out-of-the-way position, which is shown in dotted lines in FIG. 1. When the steering column is in its raised, out-of-the-way position, it is much easier for the driver to get into and out of the driver's seat. This adjustability of the steering column is even more advantageous on tractors and other vehicles where the driver sits straddling the steering column so that in the normal, driving position of the steering wheel the steering column and the steering wheel interfere more seriously with the driver's getting into or out of the driver's seat.

Referring now to FIG. 3, the steering column 11 includes a cylinder 16 in which is slidably disposed a piston 17. The piston carries an integral, hollow, axial, upwardly extending sleeve portion 18 which is in threaded engagement with a screw-threaded portion 19 of a shaft 20 connected to the steering wheel 12. With this arrangement, when the steering wheel is turned the piston 17 is moved lengthwise in the cylinder 16 in one direction or the other, depending upon the direction in which the steering wheel is turned.

A hollow end cap 21 is bolted to the upper end of the cylinder 16. This end cap is formed with an internal cavity 22 which is shaped and dimensioned to loosely receive the sleeve portion 18 of the piston. At its upper end the end cap 21 terminates in a reduced diameter neck portion 23 which rotatably receives the upper end of the steering wheel shaft 20. A suitable seal 24 is provided between the housing end cap neck portion 23 and the shaft 20 to prevent leakage of hydraulic fluid from the cylinder. The steering wheel shaft is formed with a lower end extension 25 which provides a centering guide for the piston 17 within the cylinder 16.

Figure 2:
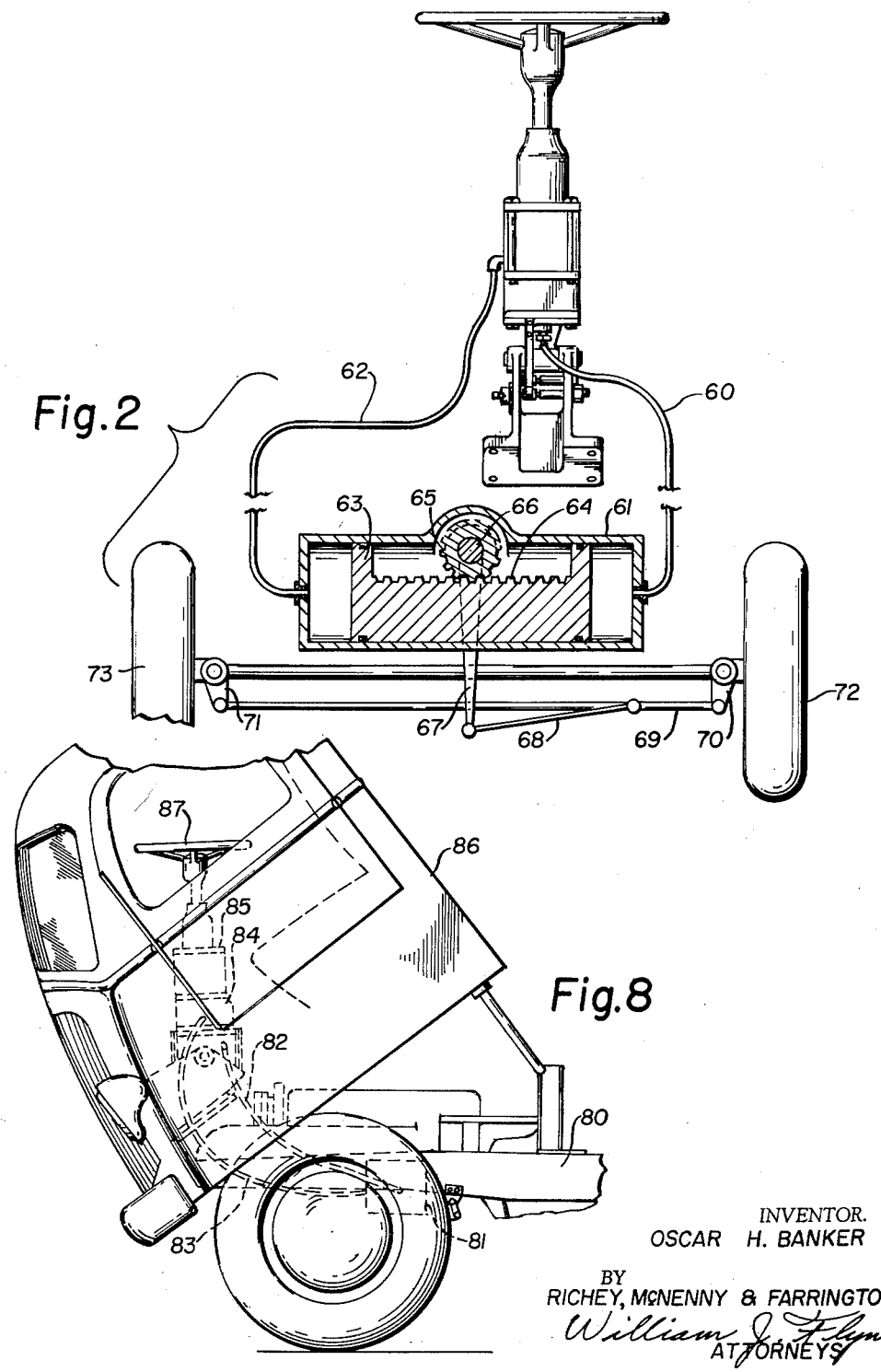
FIG. 2 shows schematically the adjustable steering column of FIG. 1 and its connections to a power steering cylinder controlling the front wheels of a vehicle.

Referring to FIG. 2, the interior of the steering column cylinder 16 below piston 17 communicates, through a flexible hose 60, with one end of a chamber in a power steering cylinder 61. A second flexible hose 62 communicates with the interior of the steering column cylinder 16 above piston 17 and extends therefrom to the opposite end of power steering cylinder 61. These hoses carry hydraulic liquid between the steering column cylinder 16 and the power steering cylinder 61. The power steering cylinder is supported by the frame of the vehicle.

A double-headed piston 63 is slidable in cylinder 61. This piston is provided with a rack 64 having its teeth meshing with a gear 65. The latter is mounted on a shaft 66 connected to a lever 67. The latter is connected through links 68–71 to the front wheels 72, 73 of the vehicle. With this arrangement, when the piston 63 moves in one direction or the other the wheels 72, 73 are turned correspondingly.

The flexible hoses 60, 62 enable the piston 63 in the power steering cylinder 61 to be controlled in response to the movement of piston 17 in the steering column cylinder 16. Downward movement of piston 17 causes increased hydraulic pressure to be applied against the right end of the power steering piston 63 and causes the pressure at the left end of piston 63 to decrease. Conversely, upward movement of piston 17 causes increased hydraulic pressure to be applied to the left end of the power steering piston 63 and causes the pressure at the right end of piston 63 to decrease.

The power steering system also includes a pump and suitable valves for controlling the flow of hydraulic liquid throughout the system. Preferably, these additional parts of the complete power steering system, which are not shown herein in order to simplify this description, are arranged substantially as shown in my aforementioned co-pending application Serial No. 860,164.

The steering column also supports a valve housing 27 in which is located a valving arrangement forming part of the power steering system.

At its lower end the steering wheel column has a rigid hinge plate 30 which is generally T-shaped in cross-section, presenting one leg 31 whose major faces lie in a vertical plane and, perpendicular thereto, an integral cross piece 32. At the lower end of its cross-piece 32 the hinge plate 30 has an integral cylindrical hub 33. A fixedly supported hinge pin 34 extends through a bore formed in the hub 33 and the adjacent portion of the vertical leg 31 of the hinge plate 30.

The hinge pin 34 is supported by the previously-mentioned bifurcated bracket 13. As best seen in FIG. 4, the respective spaced legs 13a and 13b of this bracket at their upper ends present enlarged, generally cylindrical portions 13c and 13d respectively, which fixedly support the pivot pin 34. The lower end of the hinge plate 30 is received snugly, but rotatably, between these enlarged portions 13c and 13d of the support bracket 13.

For releasably locking the steering column 11 in either of its two extreme positions there are provided a pair of leaf spring locking members 40 and 41 attached to the lower end of the steering column which are adapted to cooperate respectively with locking members 42 and 43 carried by the fixedly positioned bracket 13.

Figure 5:
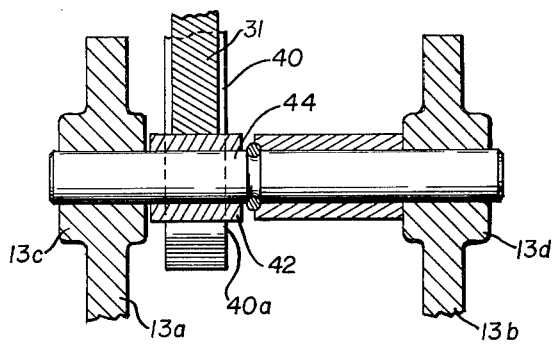
FIG. 5 is an enlarged section taken along the line 5—5 in FIG. 3 and showing the releasable locking arrangement for holding the steering wheel column in its raised out-of-the-way position.

As best seen in FIGS. 4 and 5, the locking member 42 is a cylindrical sleeve which is secured fixedly to a cross pin 44 carried by the bracket 13 and extending parallel to the pivot pin 34.

As best seen in FIG. 3, the leaf spring 40 is bolted to the front edge of the upstanding leg 31 of the hinge plate 30 at the lower end of the steering column. Spring 40 extends in cantilever fashion down beyond the lower end of this plate and presents a laterally inturned portion 40a which is positioned to bear tightly against the locking member 42 when the steering column 11 is in its raised, out-of-the-way position, as shown in FIG. 3. In this position of the parts, the offset end 40a of the spring 40 is stressed by its engagement with locking member 42 sufficiently to provide a stiff coupling between the steering column 11 and the fixed bracket 13 which will maintain the steering column in its raised, out-of-the-way position unless a substantial and deliberate downward pull is exerted by the driver on the steering wheel 12 to break this coupling. That is to say, in this position of the parts, the spring 40 coacts with the locking member 42 to provide a manually releasable lock or coupling between the fixed bracket 13 and the steering column 11.

The other leaf spring 41 is bolted to the back edge of the upstanding leg 31 of the generally T-shaped hinge member 30 at the lower end of the steering column 11. Spring 41 extends in cantilever fashion downward beyond the lower end of this hinge plate 30 and presents a laterally inturned portion 41a which is adapted to engage the locking member 43 when the steering column is lowered to its operative, driving position. As best seen in FIG. 4, the locking member 43 is a cylindrical sleeve fixedly positioned on a cross pin 45 which is supported by the bracket 13 in spaced, parallel relationship to the hinge pin 34. When the steering column is in its lowered operative position, as best seen in FIG. 1, the inturned free end 41a of spring 41 bears against the underside of the locking member 43 and is stressed by such engagement to an extent sufficient to provide a stiff coupling between the steering column 11 and the fixedly mounted bracket 13. However, this coupling can be broken by the driver simply by exerting an upward push manually on the steering wheel to lift the steering column to its raised, out-of-the-way position.

Thus, by virtue of the foregoing arrangement the steering column 11 and steering wheel 12 may be moved manually from the operative, driving position up to the raised, out-of-the-way position, and back again, simply by exerting a manual force on the steering wheel and without requiring the driver to reach down to disconnect the coupling between the steering column and the support at its lower end.

In accordance with a further aspect of this invention, provision is made for a limited angular adjustment of the driving position of the column 11, so that the steering wheel 12 may be positioned to suit the preference of the particular driver. Referring to FIG. 3, the support bracket leg 13a is formed with an elongated curved slot 50 which is arcuate about the pivot pin 34 as a center and which receives the cross pin 45 which carries the locking member 43. This slot 50 has an arcuate extent sufficient to provide for an angular adjustment of the steering column of approximately 24° about the pivot pin 34 while in its operative, driving position. The other support bracket leg 13b is formed with an identical, similarly located arcuate slot which receives the opposite end of the cross pin 45.

At this last mentioned end the cross pin 45 is externally screw-threaded at 45a (FIG. 4) and threadedly receives a clamping nut 51. A washer 52 is engaged between the clamping nut and the outside of the support bracket leg 13b.

At its other end the cross pin 45 carries a transversely extending pin 53 which normally seats in V-shaped grooves 54 formed in a metal washer 55 having a serrated inner face. The serrations on washer 55 mate with serrations on an integral raised wall 56 of the support bracket leg 13a which extends around the arcuate slot 50 therein.

With this arrangement, when the clamping nut 51 is loosened the serrated washer 55 may be disengaged from the serrations on wall 56 around the slot 50. Then, the steering column 11 may be moved pivotally about its pivot 34, with the cross pin 45 being moved along the curved slot 50 in bracket leg 13a and the corresponding slot in the opposite bracket leg 13b. When the desired angular position of the steering column has been reached the nut 51 may be tightened to clamp the cross pin 45 in this position. The cross pin 45 is securely held in this position by the engagement between the serrations on the washer 55 and the wall 56 extending around the slot 50. Throughout such limited angular adjustment of the steering column 11 the offset end 41a of its locking spring stays in engagement with the locking member 43 carried by support bracket 13. Therefore, the steering column stays spring-locked to the support bracket 13 regardless of the angular adjustment of the steering column through the limited range permitted by the arcuate slots in the support bracket.

Figure 6:
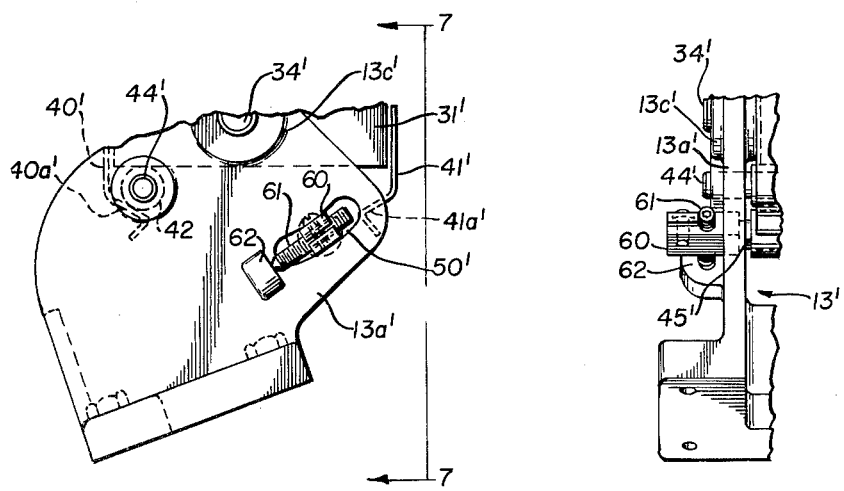
FIG. 6 is an enlarged side elevation showing an alternative arrangement for the limited adjustment of the operative driving position of the steering wheel column.
Figure 7:
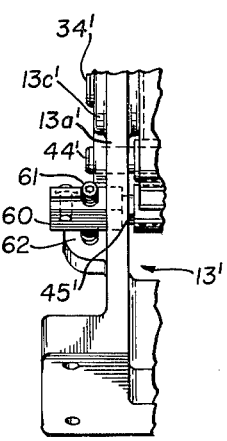
FIG. 7 is a fragmentary front elevation of the FIG. 6 arrangement, viewed from the line 7—7 in FIG. 6.

An alternative arrangement for the same purpose is shown in FIGS. 6 and 7. Here the elements which correspond to those in the first-described embodiment are designated by the same reference numerals, with a "prime" added. In this embodiment one leg 13' of the bifurcated support bracket 13' is formed with an arcuate slot 50' and the other support bracket leg (not shown) is formed with a similarly located arcuate slot. The cross pin 45' has attached thereto a guide member 60 of square cross-section which is snugly, but slidably received in the arcuate slot 50'. An adjusting screw 61 extends threadedly through this guide member 60 and at its inner end bears against a fixed boss 62 on the support bracket leg 13a' just slightly beyond one end of the arcuate groove 50'.

The opposite end of the cross pin 45' is screw-threaded and receives a clamping nut and washer similar to the arrangement shown in FIG. 4.

With this arrangement, when the clamping nut is loosened the adjusting screw 61 may be turned to adjust the position of the guide member 60 along the arcuate slot 50', so as to adjust correspondingly the angular position of the steering column 11. Then, after the steering column has been adjusted to the desired position the clamping nut may be tightened again to clamp the parts in this position.

Thus, with either of these arrangements, it is possible to adjust the steering column angularly so that its operative, driving position may be adjusted to suit the preference of the particular driver.

In accordance with another aspect of this invention a power steering arrangement is provided for a truck having a tilting cab. As shown in FIG. 8, the truck has a frame 80 which supports a power steering cylinder 81 of the type shown in FIG. 2. The opposite ends of the power steering cylinder 81 are connected through flexible hoses 82 and 83 to the interior of the cylinder 84 in the steering column 85. The power steering system is operated from the steering wheel 87 in the same manner as described in connection with FIG. 2.

The steering column 85 is located inside the driver's cab 86, which is tiltable with respect to the truck frame, as shown in FIG. 8. Obviously, when the cab tilts, the steering column 84 also tilts with respect to the truck frame. The flexibility of the hoses 82, 83 connecting the steering column cylinder 84 with the power steering cylinder 81 supported by the truck frame enables this action to take place without affecting the power steering system.

In the embodiment of FIG. 8, the steering column 84 may be pivotally adjustable with respect to the cab 86 in the same manner as the FIG. 1 arrangement and for the same purpose. Alternatively, the steering column may be fixedly positioned with respect to the cab at all times.

From the foregoing description it will be apparent that the particular embodiments which are illustrated in the accompanying drawings are particularly well suited for the accomplishment of the stated purposes of this invention. However, it is to be understood that, while there have been described in detail herein and illustrated in the accompanying drawings certain presently-preferred embodiments of this invention, various modifications, omissions and refinements which depart from the disclosed embodiments may be adopted without departing from the spirit and scope of this invention.

What is claimed is:

1. In combination with a land vehicle having a steering wheel for operation by the driver of the vehicle, and fluid-operated power steering means operated by the steering wheel for steering the vehicle, a steering wheel column member which supports the steering wheel at its upper end, a support member rigidly mounted on the vehicle, said column member at its lower end being pivotally mounted on said support member for adjustment angularly from a first position in which it supports the steering wheel at a location for operation by the driver of the vehicle to a second position in which the column member and the steering wheel are out of the driver's way, first locking means for releasably locking the column member in said first position, said first locking means comprising a locking element mounted on one of said members and a leaf spring mounted on the other of said members and having a laterally offset portion which bears resiliently against said locking element in said first position of the column member, said first locking means being releasable in response to a manual force exerted on the steering wheel in a direction for moving the column member to said second position, and second locking means which locks said column member in said second position, said second locking means comprising a locking element mounted on one of said members and a leaf spring mounted on the other of said members and having a laterally offset portion which bears resiliently against said last mentioned locking element in said second position of the column member, said second locking means being releasable in response to a manual force exerted on the steering wheel in a direction for moving the column member to said first position.

2. The combination of claim 1 wherein there is provided means for permitting limited angular adjustment of the column member while locked in said first position.

3. In combination with a land vehicle steered by a steering wheel, a steering wheel column which supports the steering wheel at its upper end, means supporting said column for pivotal adjustment from a driving position to a raised, out-of-the-way position, and spring lock means for locking said column in said positions, said spring lock means being releasable by a manual force exerted on the steering wheel in a direction to move the column from one of said positions toward the other, said spring lock means comprising a pair of leaf springs mounted respectively in cantilever fashion on the lower end of the steering column, each of said leaf springs having a laterally offset portion, and a pair of locking members on said supporting means for the column, said locking members being positioned respectively for engagement of one by said offset portion of one leaf spring in the driving position of the column and for engagement of the other by said offset portion of the other leaf spring in the raised position of the column, each locking member stressing the respective leaf spring when engaged thereby in the respective position of the column to provide a stiff coupling between the column and said supporting means.

References Cited in the file of this patent

UNITED STATES PATENTS

| | | |
|---|---|---|
| 702,980 | Maxim | June 24, 1902 |
| 804,375 | Buffum | Nov. 14, 1905 |
| 840,660 | Riker | Jan. 8, 1907 |
| 990,915 | Slepicka | May 2, 1911 |
| 1,125,621 | Winton et al. | Jan. 19, 1915 |
| 1,806,136 | Weiss | May 19, 1931 |
| 2,376,491 | Kinney | May 22, 1945 |
| 2,770,981 | Tieber | Nov. 20, 1956 |
| 2,873,979 | Venditty | Feb. 17, 1959 |
| 2,937,881 | Norrie | May 24, 1960 |